INVENTOR.
Edward J. Frey
BY
His Attorney

United States Patent Office 2,781,059
Patented Feb. 12, 1957

2,781,059
FLOW CONTROL DEVICE

Edward J. Frey, Dayton, Ohio, assignor to General Motors Corporation, Detroit, Mich., a corporation of Delaware Application January 8, 1954, Serial No. 402,947

5 Claims. (Cl. 138—46)

This invention relates to domestic appliances and more particularly to a controller for fluid such as water being supplied to an automatic washing machine or the like from a source under varying head pressure.

An object of this invention is to provide a controller which may be manufactured economically without the use of expensive tools or the like.

Further objects and advantages of the present invention will be apparent from the following description, reference being had to the accompanying drawings wherein a preferred form of the invention is clearly shown.

Figure 2:
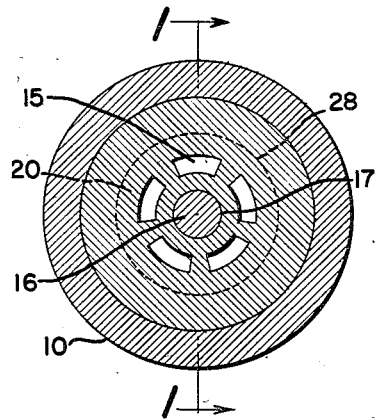
Figure 2 is a transverse cross-section taken along the line 2—2 of Figure 1.

A controller embodying my invention may include an outer casing 10 having an inner fluid flow channel including an outlet portion 11, an inlet portion 12 of larger cross-section, and a shoulder 13 forming part of an intermediate wall portion. A disk 14 forming another part of the intermediate wall portion is secured adjacent the shoulder 13 and is provided with openings 15, which connect said inlet and outlet portions 12 and 11. An inner solid member 16 is supported by the disk 14, for example, by the threaded connection 17. The solid member 16 has an outer tubularly shaped surface 18.

An outer flexible tube member 20 is placed around the solid member 16, with an end 21 against the disk 14. The flexible tube member 20 has an inner surface 25 in contact with the tubularly shaped surface 18 of the solid member 16. One of the surfaces 18 or 25, such as the surface 25, has longitudinally directed grooves 26 extending along the inlet portion 12 and being aligned with the openings 15 in the disk 14. When fluid under varying head pressure enters the inlet portion 12, it has a high velocity fluid flow through the grooves 26, and openings 15, and has a static fluid pressure on the outer surface 28 of the flexible tube member 20 radially toward the grooves 26.

All of the members of the controller can be produced by simple boring operations, threading operations and the like without the necessity of expensive tools.

Figure 1:
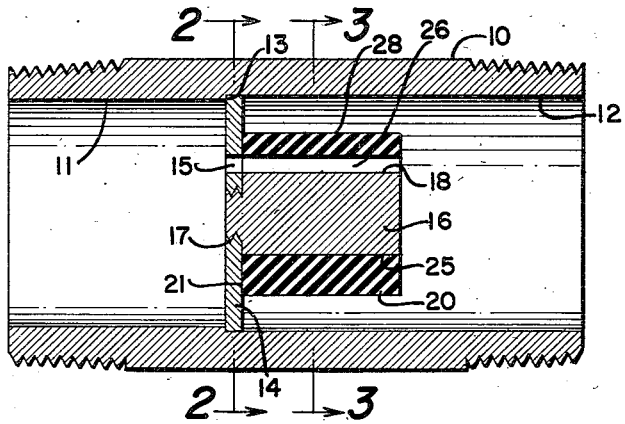
Figure 1 is a longitudinal cross-section taken along the line 1—1 of Figure 2.
Figure 3:
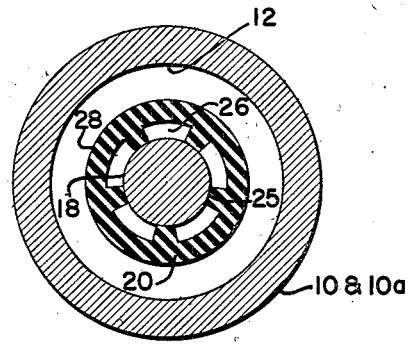
Figure 3 is a transverse cross-section taken along the line 3—3 of Figure 1 and Figure 4.

In the operation of the controller shown in Figures 1, 2 and 3 the controller may be connected between the solenoid-thermostatic controller and the washing machine substantially as indicated in my simultaneously filed application for domestic appliances, Serial No. 402,944 filed January 8, 1954. Water under varying head pressure enters at 12 and flows at high velocity kinetic head pressure through the grooves 26 and openings 15, and exerts a static fluid head pressure radially on the outer surface 28 towards the grooves 26. The difference between the pressures at 28 and 26 causes a flexing action in the tube 20 toward the grooves 26 which tends to reduce the cross-section of the grooves 26 proportionally to variations of head pressure. The result is that, the higher the head pressure, the more restriction is placed on the water flowing through the grooves 26. This tends to iron out the discharge at the outlet 11 to make it a substantially constant discharge even under variations in pressure at inlet 12 so that the volume may be measured by a timer.

The size of grooves 26 and the thickness and flexibility of tube 20 may be calibrated to obtain the desired rate of discharge at outlet 11 in response to varying head pressures at the inlet 12.

Figure 5:
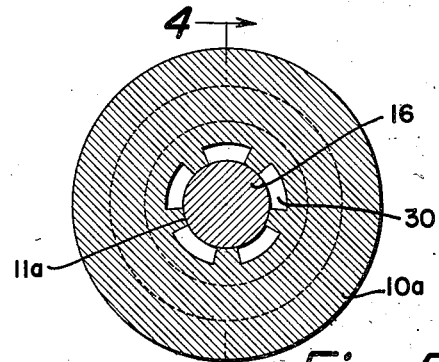
Figure 5 is a cross-section along the line 5—5 of Figure 4.
Figure 4:
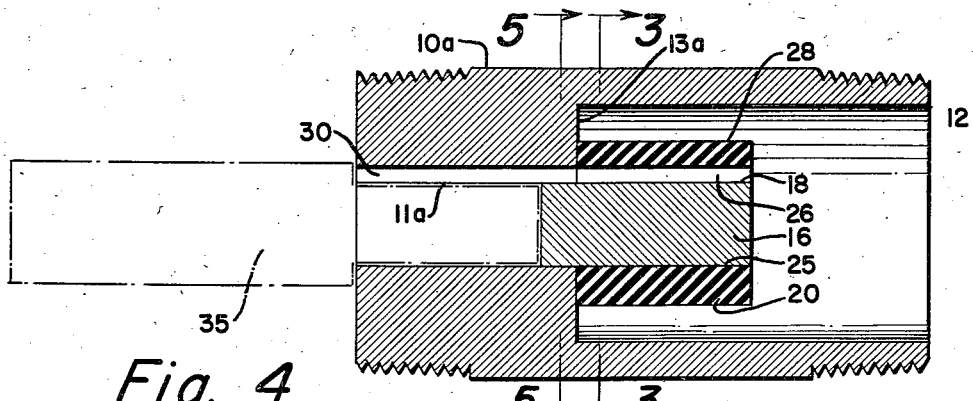
Figure 4 is a view similar to Figure 1 but showing a slightly modified form.

In the modification shown in Figure 4, the disk 14 may be omitted by making the outlet portion 11a of outer casing 10a somewhat smaller than in Figure 1 to produce a larger intermediate portion 13a. Grooves 30 are broached in the outlet portion 11a. The solid member 16a is press-fitted into the portion 11a, and the extent of the press-fit may be limited by the stopping tool 35 or by the limit of travel of the press. The flexible tube member 28 is fitted over the solid member 16a with the grooves 26 in alignment with the grooves 30. Parts which have substantially the same construction and function are numbered similarly to corresponding parts of Figures 1, 2 and 3. The operation of the modification of Figures 4 and 5 is substantially the same as previously described with respect to Figures 1, 2 and 3.

While the form of embodiment of the invention as herein disclosed constitutes a preferred form, it is to be understood that other forms might be adapted as may come within the scope of the claims which follow.

What is claimed is as follows:

1. A controller for fluid under varying head pressure comprising: an outer casing having an inner fluid flow channel including a cylindrical outlet portion of uniform cross-section for a substantial length, a cylindrical inlet portion of larger cross-section and of uniform cross-section for a substantial length, and an intermediate wall portion between said inlet and outlet portions, said outlet portion having one or more longitudinal grooves; an inner solid cylindrical member of uniform diameter substantially the same as the diameter of said outlet portion extending for a substantial length and being partly in and supported by said outlet portion and having a portion cantilevered in said inlet portion and extending axially along said inlet portion; and an outer flexible tube member in said inlet portion around the cantilevered portion of said solid member with an end against said intermediate wall portion, said flexible tube member being radially spaced from said outer casing, said flexible member having an inner cylindrical surface of uniform cross-section throughout its effective controller length and having one or more longtiudinal grooves of uniform cross-section throughout their effective controller length and aligned with said first named one or more longitudinal grooves.

2. A controller having an inlet side and an outlet side and adapted to be connected in a fluid line for maintaining a substantially constant rate of flow in said line irrespective of varying head pressure comprising: an outer flexible tube member of uniform cross-section throughout its effective controller length having an inner tubular surface provided with longitudinally directed grooves of uniform cross-section throughout their effective controller length; an inner solid member of uniform cross-section throughout its effective controller length having an outer tubular shaped surface in contact with said inner surface between said grooves; and means radially spaced from said outer flexible tube member defining a pressure space therewith; said pressure space being adapted to contain static inlet fluid head pressure for variably constricting said grooves whereby the flow of fluid from said inlet side to said outlet side through said grooves is controlled.

3. A controller having an inlet side and an outlet side and adapted to be connected in a fluid line for maintaining a substantially constant rate of flow in said line irrespective of varying head pressure comprising: an outer casing having an inner fluid flow channel; an outer flexible tube member in said casing of uniform cross-section throughout its effective controller length and having an inner tubular surface provided with longitudinally directed grooves of uniform cross-section throughout their effective controller length; an inner solid member supported by said casing of uniform cross-section throughout its effective controller length and having an outer tubular shaped surface in contact with said inner surface between said grooves; and outer flexible tube member being radially spaced from said casing and forming an annular pressure space therewith; said pressure space being adapted to contain static inlet fluid head pressure for variably constructing said grooves whereby the fluid flow through said grooves from said inlet side to said outlet side is controlled.

4. A controller for fluid under varying head pressure comprising: an outer casing having an inner fluid flow channel including an outlet portion, an inlet portion of larger cross-section and an intermediate wall portion between said inlet and outlet portions; an inner solid member supported by and extending through said wall portion and extending axially along said inlet portion; said inner solid member being of uniform cross-section throughout its effective controller length and having an outer tubular shaped surface; and an outer flexible tube member in said inlet portion around said solid member radially spaced from the inner wall of said casing with an end against said intermediate wall portion, said flexible tube member being of uniform cross-section throughout its effective controller length and having an inner tubular surface provided with longitudinally directed grooves of uniform cross-section throughout their effective controller length, said grooves connecting said inlet and outlet portions, and said flexible tube member being in contact with the tubular shaped surface of said solid member between said grooves.

5. A controller for fluid under varying head pressure comprising: an outer casing having an inner fluid flow channel including an outlet portion, an inlet portion of larger cross-section, and an intermediate wall portion between said inlet and outlet portions; a disk secured adjacent said intermediate wall portion and provided with openings connecting said inlet and outlet portions; an inner solid member supported by said disk extending axially along said inlet portion, said solid portion being of uniform cross-section throughout its effective controller length and having an outer tubular shaped surface; and an outer flexible tube member radially spaced from said outer casing in said inlet portion around said solid member with an end against said disk, said flexible tube member being of uniform cross-section throughout its effective controller length and having an inner tubular surface in contact with said tubular shaped surface on said solid member, said inner surface of said flexible member having longitudinally directed grooves of uniform cross-section throughout their effective controller length extending along said inlet portion and being aligned with said openings in said disk to produce high velocity fluid flow through said grooves and static fluid head pressure on the outer surface of said flexible tube member.

References Cited in the file of this patent

UNITED STATES PATENTS

| | | |
|---|---|---|
| 2,506,152 | Hunter | May 2, 1950 |
| 2,573,712 | Kallam | Nov. 6, 1951 |

FOREIGN PATENTS

| | | |
|---|---|---|
| 372,286 | Great Britain | May 2, 1932 |